United States Patent
Draper et al.

(10) Patent No.: US 8,097,381 B2
(45) Date of Patent: Jan. 17, 2012

(54) SOLID OXIDE FUEL CELL GENERATOR INCLUDING A GLASS SEALANT

(75) Inventors: Robert Draper, Pittsburgh, PA (US); Gong Zhang, Murrysville, PA (US); Roswell J. Ruka, Pittsburgh, PA (US); Kevin P. Litzinger, Level Green, PA (US); Paolo R. Zafred, Murrysville, PA (US); Richard A. Basel, Pittsburgh, PA (US)

(73) Assignee: Siemens Energy, Inc., Orlando, FL (US)

( * ) Notice: Subject to any disclaimer, the term of this patent is extended or adjusted under 35 U.S.C. 154(b) by 1119 days.

(21) Appl. No.: 11/877,908

(22) Filed: Oct. 24, 2007

(65) Prior Publication Data
US 2009/0081517 A1    Mar. 26, 2009

Related U.S. Application Data

(60) Provisional application No. 60/974,150, filed on Sep. 21, 2007.

(51) Int. Cl.
*H01M 2/20* (2006.01)

(52) U.S. Cl. ........ 429/469; 429/510; 429/466; 429/488; 429/497; 501/11; 501/17

(58) Field of Classification Search .................. 429/510, 429/497, 488, 466, 469; 501/11, 17
See application file for complete search history.

(56) References Cited

U.S. PATENT DOCUMENTS

| | | |
|---|---|---|
| 4,395,468 A | 7/1983 | Isenberg |
| 4,476,198 A | 10/1984 | Ackerman et al. |
| 4,640,875 A | 2/1987 | Makiel |
| 4,728,584 A | 3/1988 | Isenberg |
| 4,791,035 A | 12/1988 | Reichner |
| 4,874,678 A | 10/1989 | Reichner |
| 4,910,100 A | 3/1990 | Nakanishi et al. |
| 5,047,299 A | 9/1991 | Shockling |
| 5,200,279 A | 4/1993 | Draper et al. |
| 5,432,024 A | 7/1995 | Soma et al. |
| 5,453,331 A * | 9/1995 | Bloom et al. ................. 429/496 |
| 6,271,158 B1 | 8/2001 | Xue et al. |

(Continued)

FOREIGN PATENT DOCUMENTS

DE    4334438 A1    4/1995

(Continued)

OTHER PUBLICATIONS

Loehman, et al., "Evaluation of Sealing Glasses for Solid Oxide Fuel Cells." 26th Annual Conference on Composites, Advanced Ceramics, Materials, and Structures: A (2002).*

*Primary Examiner* — Barbara Gilliam
*Assistant Examiner* — Zachary Best (57) ABSTRACT

A solid oxide fuel cell generator is provided for electrochemically reacting a fuel gas with a flowing oxidant gas at an elevated temperature to produce power. The generator includes a generator section receiving a fuel gas and a plurality of elongated fuel cells extending through the generator section and having opposing open fuel cell ends for directing an oxidant gas between opposing plena in the generator. A sealant defines a seal on the fuel cells adjacent at least one of the fuel cell ends. The sealant is a modified lanthanum borate aluminosilicate glass composition having a minimal amount of boron oxide and silica, and in which the sealant maintains substantially constant physical characteristics throughout multiple thermal cycles.

5 Claims, 3 Drawing Sheets

U.S. PATENT DOCUMENTS

| | | |
|---|---|---|
| 6,376,117 B1 | 4/2002 | Kantak et al. |
| 6,402,156 B1 | 6/2002 | Schutz et al. |
| 6,492,048 B1 | 12/2002 | Draper et al. |
| 6,610,434 B1 | 8/2003 | Draper et al. |
| 6,677,069 B1 | 1/2004 | Piascik et al. |
| 6,764,784 B2 | 7/2004 | Gillett et al. |
| 7,157,172 B2 | 1/2007 | Draper et al. |
| 2003/0054209 A1 | 3/2003 | Gillett et al. |
| 2003/0203263 A1 | 10/2003 | Brown et al. |
| 2005/0266288 A1 | 12/2005 | Zafred et al. |
| 2006/0019813 A1 | 1/2006 | Yoshii |
| 2007/0087254 A1 | 4/2007 | Iyengar et al. |
| 2008/0176731 A1* | 7/2008 | Brow et al. ............ 501/17 |

FOREIGN PATENT DOCUMENTS

| | | |
|---|---|---|
| EP | 0562724 A2 | 2/1993 |
| EP | 1008563 A1 | 6/2000 |
| WO | 02094727 A1 | 11/2002 |

* cited by examiner

SOLID OXIDE FUEL CELL GENERATOR INCLUDING A GLASS SEALANT

CROSS REFERENCE TO RELATED APPLICATION

This application claims the benefit of provisional application No. 60/974,150 filed on Sep. 21, 2007. The application is incorporated by reference herein in its entirety.

FIELD OF THE INVENTION

The present invention relates to fuel cells and, more particularly, to fuel cell generators including fuel cells that are open at both ends and a glass sealant composition for preventing flow of gases between adjacent plena in the fuel cell generator.

BACKGROUND OF THE INVENTION

The dynamics of fuel cell stacks require that preferably fuel enters the stack from the opposite end of where the ambient air enters. As the fuel travels over cells, down the length of the stack, it is subject to electrochemical reactions. Typically a fraction of the unused fuel/combustion products mixture is recirculated, while a fraction is mixed with vitiated air to satisfy the mass balance. In prior art tubular solid oxide fuel cell (SOFC) generators, the SOFC geometry is cylindrical with one closed end. Fuel enters the stack at the cell closed end and flows upward in the space surrounding the cells. Air enters each cell through an air feed tube (AFT) concentrically positioned within the cell, exits the AFT at the closed end, and flows upward in the annular space between the AFT and the cell. As the fuel and air flow from the cell closed end to the open end, most of the fuel is electrochemically reacted with oxygen from the air producing electricity. The depleted fuel exiting the cell stack, which typically consists of 20% ($H_2$+ CO) and 80% ($H_2O$+$CO_2$), is combusted with the vitiated air exiting the cell in a combustion zone above the cell open ends to create exhaust gas. In this configuration no seals are required to separate the fuel stream from the air stream due to the closed end design of the tubular SOFC and the use of AFT's. A known construction for this type of fuel cell is described in U.S. Pat. No. 6,764,784.

In a known method of manufacturing closed end fuel cells, the interconnection between cells, the electrolyte and the fuel electrode layers are deposited on an extruded and sintered lanthanum manganite air electrode tube by plasma spray. A lanthanum chromite interconnection is provided in the form of a narrow strip that runs axially over the entire active length of the cell. A yttria stabilized zirconia electrolyte is deposited in such a way as to almost entirely cover the cell. The electrolyte layer overlaps the edges of the interconnection strip but leaves most of the interconnection exposed. Because the interconnection and electrolyte layers are dense, the overlap feature provides a seal that prevents direct mixing of air and fuel gas. A nickel/yttria stabilized zirconia cermet fuel electrode layer is deposited in such a way as to almost entirely cover the electrolyte, but leaves a narrow margin of electrolyte between the interconnection and the fuel electrode. This margin prevents shorting of the cell. Series electrical connections between cells are accomplished by means of a structure made from nickel foam and nickel screen. The foam part of which becomes sintered to the interconnection while the screen part becomes sintered to the fuel electrode of the adjacent cell. A solid oxide fuel cell according to this construction is described in U.S. Pat. No. 7,157,172, which patent is incorporated herein by reference.

In the above described closed end fuel cell designs, the closed end is a highly stressed region during plasma spray operations performed during manufacturing to deposit the interconnections, the electrolyte, and the fuel electrode. Elimination of the closed end may be expected to reduce failure due to thermal stress and thus significantly increase the yield during manufacturing. Furthermore, elimination of the air feed tubes would represent a substantial cost savings and a design simplification.

There is a continuing need for a fuel cell stack construction that addresses problems associated with manufacturing of fuel cell stacks, while providing a high power density and increased operating efficiencies.

SUMMARY OF THE INVENTION

In accordance with one aspect of the invention, a solid oxide fuel cell generator is provided for electrochemically reacting a fuel gas with a flowing oxidant gas at an elevated temperature to produce power. The generator comprises a generator section receiving a fuel gas and a plurality of elongated fuel cells extending through the generator section and having opposing open fuel cell ends for directing an oxidant gas between opposing plena in the generator. A sealant defines a seal on the fuel cells adjacent at least one of the fuel cell ends. The sealant comprises a modified lanthanum borate aluminosilicate glass composition, and the lanthanum borate aluminosilicate glass composition includes $B_2O_3$ and $SiO_2$ having a combined mole percent of less than about 32%.

In accordance with another aspect of the invention, a solid oxide fuel cell generator is provided for electrochemically reacting a fuel gas with a flowing oxidant gas at an elevated temperature to produce power. The generator comprises a generator section receiving a fuel gas and a plurality of elongated fuel cells extending through the generator section and having opposing open fuel cell ends for directing an oxidant gas between opposing plena in the generator. A sealant defines a seal on the fuel cells adjacent at least one of the fuel cell ends. The sealant comprises a modified lanthanum borate aluminosilicate glass composition, and the lanthanum borate aluminosilicate glass composition includes $La_2O_3$ present in an amount of between about 0 to about 20 mole %, $ZrO_2$ present in an amount of between about 0 to about 5 mole %, and $YO_{1.5}$ or $ScO_{1.5}$ present in an amount of between about 0 to about 0.5 mole %.

In accordance with a further aspect of the invention, a solid fuel oxide fuel cell generator is provided comprising a generator section and a plurality of elongated fuel cells extending through the generator section. A fuel distribution plenum feeds fuel to the generator section adjacent to a first end of the fuel cells, and a combustion plenum is located at a second end of the fuel cells, opposite the first end, for combusting depleted fuel and an oxidant gas. An intermediate plenum is located between the generator section and the fuel plenum and is in fluid communication with an interior flow area of the fuel cells, and an absolute seal is located between the generator section and the intermediate plenum and prevents flow gases between the generator section and the intermediate chamber.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
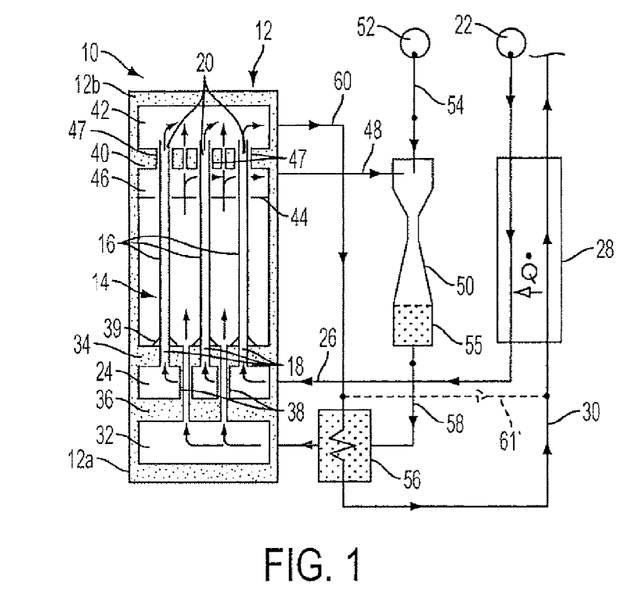
FIG. 1 is a schematic diagram of a first embodiment of a fuel cell generator in accordance with the present invention.

Referring to FIG. 1, a first embodiment of the invention is illustrated comprising a fuel cell generator 10 including a housing 12 defining a plurality of plena or chambers including a central chamber defining a generator section 14 of the generator 10. The housing 12 further encloses a plurality of elongated fuel cells 16 extending through the generator section 14 and having opposing ends comprising an open first end 18 and an open second end 20. The fuel cells 16 preferably comprise solid oxide fuel cells (SOFC's) and convey an oxidant gas from one end of the housing 12 to an opposite end of the housing 12. In a typical application of the invention, the oxidant gas comprises air, and will hereafter be referred to as such. It should be noted that although only three fuel cells 16 are illustrated, any number of fuel cells 16, and preferably more than three, may be provided in accordance with the present invention.

Air is supplied from an air (oxidant) supply 22 to an air (oxidant) plenum 24 located adjacent to a first end 12a of the housing 12. The air is conveyed via an air supply line 26 through a recuperative air preheater 28 where the air is preheated by combustion products conveyed from the generator 10 through an exhaust line 30. A first partition defined by a first positioning board 34 rigidly supports the first ends 18 of the fuel cells 16 and separates the generator section 14 from the air plenum 24. The air plenum 24 is located adjacent to and in fluid communication with the first ends 18 of the fuel cells 16 such that air conveyed to the air plenum 24 will flow into the fuel cells 16 through the first ends 18.

A fuel plenum 32 is located adjacent to the first end 12a of the housing 12 and is separated from the air plenum 24 by an inner wall 36, where the air plenum 24 comprises an intermediate plenum between the generator section 14 and the fuel plenum 32. A plurality of fuel passages are defined by tubulations 38 and extend between the inner wall 36 and the first positioning board 34 for conveying fuel from the fuel plenum 32 to the generator section 14. The first positioning board 34 preferably comprises a ceramic structure, such as an Al—Mg—O spinel/MgO material, and a seal 39 comprising a compliant sealant provides an absolute seal preventing passage of gases at the junction between the first ends 18 of the fuel cells 16 and the first positioning board 34, as will be described further below.

A second partition defined by a second positioning board 40 supports the second ends 20 of the fuel cells 16 adjacent to a second end 12b of the housing 12 and defines a combustion plenum 42 in fluid communication with the second ends 20 of the fuel cells 16. A dividing wall 44 is located at an end of the generator section 14 adjacent to the second positioning board 40 and a recirculation zone 46 is defined between the dividing wall 44 and the second positioning board 40. Depleted fuel that has passed through the generator section 14 from the fuel plenum 32 passes into the recirculation zone 46.

The second ends 20 of the fuel cells 16 are in sliding engagement with the second positioning board 40 to accommodate thermal movement, i.e., thermal expansion and contraction, of the fuel cells 16 relative to the second positioning board 40. The second positioning board 40 preferably comprises a porous ceramic support structure, and the junction between the second ends 20 of the fuel cells 16 and the second positioning board 40 comprises a tolerant seal 47. No attempt need be made to accomplish a perfect seal at the juncture of the fuel cells 16 and the second positioning board 40, since leakage of a fraction of the depleted fuel from the recirculation zone 46 to the combustion plenum 42 is acceptable. The combustion plenum 40 additionally receives vitiated air conveyed from the air plenum 32 through the fuel cells 16 for mixing with the depleted fuel.

A portion of the depleted fuel is conveyed out of the recirculation zone 46 through a recirculation line 48 to an ejector pump 50. Fresh fuel is provided from a fuel supply 52 at a high pressure through a fuel line 54 to the ejector pump 50 and provides the motive force for drawing the depleted fuel from the recirculation zone 46 as it combines with the fresh fuel in the ejector pump 50. The combined fresh fuel and depleted fuel passes through a pre-reformer 55 where higher hydrocarbon elements of the incoming fuel are reformed and is then conveyed from the ejector pump 50 to an external reformer 56 through a fuel transfer line 58, and is then conveyed to the fuel plenum 32.

The fraction of the depleted fuel that passes from the recirculation zone 46 through the second positioning board 40 to the combustion plenum 42 combusts with the vitiated air that has passed through the fuel cells 16. The combustion products may be conveyed through a combustion product line 60 to the reformer 56 to provide heat to support a reformation process performed on the fuel, such as is well known in the art. In addition, the combustion products are conveyed from the reformer 56 through the exhaust line 30 to the preheater 28 for preheating incoming air, as described above.

Figure 1A:
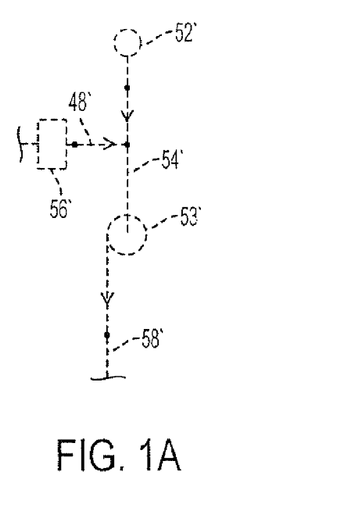
FIG. 1A is a schematic diagram of an alternative configuration of the fuel supply section of the generator of FIG. 1.

In an alternative configuration, the exhaust stream may be routed through a line 61' (shown in dotted line) directly to the preheater 28. In such a configuration, the ejector pump 50 would be replaced by a higher mass flow rate pump. Specifically, the ejector pump 50 may be replaced by a centrifugal circulator 53', as illustrated by FIG. 1A in which an alternative configuration of the fuel supply section of the generator of FIG. 1 is illustrated and in which elements corresponding to elements shown in FIG. 1 are labeled with the same reference numeral primed. As seen in FIG. 1A, the centrifugal circulator 53' replaces the ejector pump 50, and receives a combined stream of fresh fuel and depleted fuel through the fuel line 54'. The centrifugal circulator 53' provides a higher recirculation mass flow rate than the ejector pump 50. The reformer 56' is moved to a location upstream of the centrifugal circulator 53' in the recirculation line 48', and the heat for reforming is provided by the depleted fuel and combustion products in the recirculated fuel stream leaving the generator 10 through the recirculation line 48'.

Figure 2:
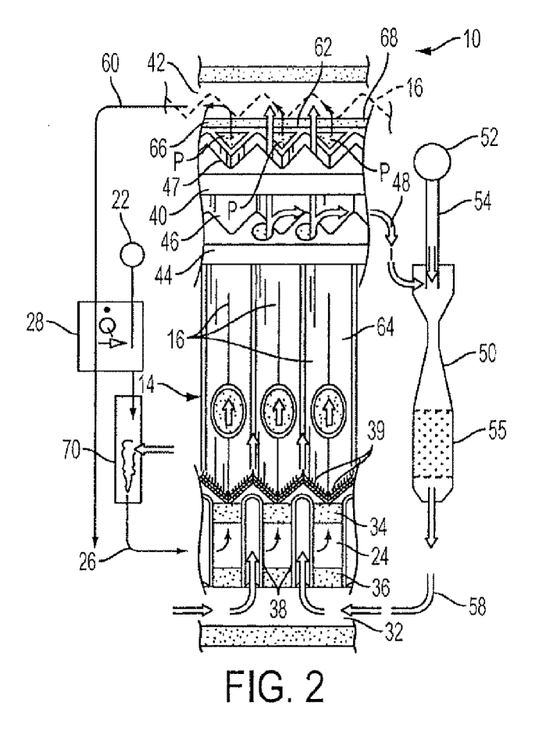
FIG. 2 is diagrammatic illustration of a specific configuration of the generator of FIG. 1.

FIG. 2 illustrates a specific configuration of the generator 10 described above with reference to FIG. 1, and elements in FIG. 2 corresponding to FIG. 1 are identified with the same reference numerals. The generator shown in FIG. 2 includes fuel cells 16 having a cell geometry in which a lanthanum manganite air electrode has the geometric form of a number of integrally connected elements of triangular cross section. These cells comprise Delta X cells, where Delta refers to the triangular shape of the elements and X refers to the number of elements, i.e., the number of fuel cells 16. The resulting overall cross section has a flat face on one side and a multi-faceted face on the other side. An additional row of cells 16 is shown in outline to illustrate the series connection of the fuel cell structure. The air flows within discrete passages P of triangular shape. A lanthanum chromite interconnection covers the flat face 62, and a zirconia electrolyte covers the opposing multifaceted face 64 of the cell geometry and overlaps the edges of the interconnection but leaves most of the interconnection exposed. A nickel/yttria or scandia stabilized zirconia fuel electrode covers most of the electrolyte but leaves a narrow margin of electrolyte between the interconnection and the fuel electrode. Series electrical connections between cells 16 is accomplished by means of a flat nickel felt or nickel foam panel 66, one face of which is sintered to the interconnection at the face 62 while the other face 68 contacts the apexes of the triangular multifaceted fuel electrode face 64 of the adjacent cell (illustrated by dotted line fuel cells 16). Fuel may flow in the discrete passages that are formed between the fuel electrode coated facets of the multifaceted face 64 of one cell 16 and the nickel felt (or foam) covered flat interconnection face 68 of the adjacent cell 16.

The configuration shown in FIG. 2 further illustrates an alternative configuration for the fuel recirculation circuit in which a reformer is not included. After the fuel passes through the fuel pre-reformer 57, the pre-reformed fuel may be conveyed directly to the fuel plenum 32, without passing through an external reformer, if the pre-reformed fuel is directly oxidized on the fuel cell surface, i.e., via anode reforming. In addition, a start-up heater 70 may be included in the air supply line 26 to provide additional heat to the air during start-up of the generator 10.

Figure 3:
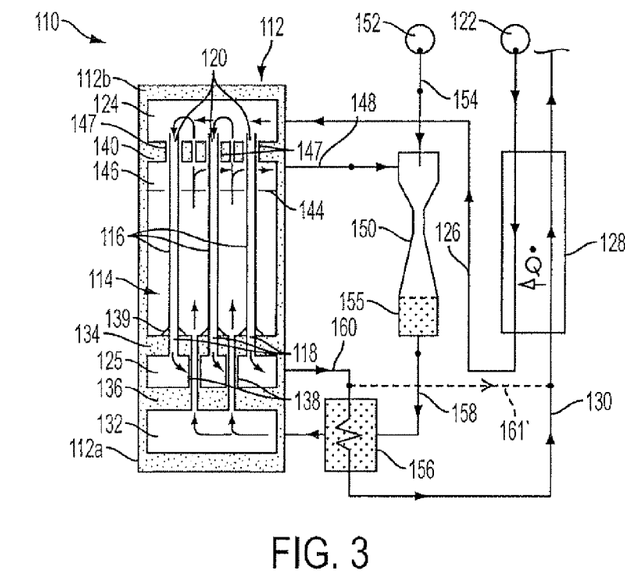
FIG. 3 is a schematic diagram of a second embodiment of the fuel cell generator in accordance with the present invention.

Referring to FIG. 3, a second embodiment of the fuel cell generator of the present invention is illustrated in which elements corresponding to elements of the embodiment of FIG. 1 are labeled with the same reference number increased by 100. In accordance with the second embodiment, a fuel cell generator 110 is provided including a housing 112 defining a plurality of plena or chambers including a central chamber defining a generator section 114 of the generator 110. The housing 112 further encloses a plurality of elongated fuel cells 116 extending through the generator section 114 and having opposing ends comprising an open first end 118 and an open second end 120. The fuel cells 116 preferably comprise solid oxide fuel cells (SOFC's) and convey an oxidant gas, i.e., air, from one end of the housing 112 to an opposite end of the housing 112. It should be noted that although only three fuel cells 116 are illustrated, any number of fuel cells 116, and preferably more than three, may be provided in accordance with the present invention.

A first partition defined by a first positioning board 134 rigidly supports the first ends 118 of the fuel cells 116 and separates the generator section 114 from an exhaust plenum 125. The exhaust plenum 125 is located adjacent to and in fluid communication with the first ends 118 of the fuel cells 116.

A fuel plenum 132 is located adjacent to a first end 112*a* of the housing 112 and is separated from the exhaust plenum 125 by an inner wall 136, where the exhaust plenum 125 comprises an intermediate plenum between the generator section 114 and the fuel plenum 132. A plurality of fuel passages are defined by tubulations 138 and extend between the inner wall 136 and the first positioning board 134 for conveying fuel from the fuel plenum 132 to the generator section 114. The first positioning board 134 preferably comprises a ceramic structure, such as an Al—Mg—O spinel/MgO material, and a seal 139 comprising a compliant sealant provides an absolute seal preventing passage of gases at the junction between the first ends 118 of the fuel cells 116 and the first positioning board 134, as will be described further below.

A second partition defined by a second positioning board 140 supports the second ends 120 of the fuel cells 116 adjacent to a second end 112*b* of the housing 112 and defines an air feed/combustion plenum 124 in fluid communication with the second ends 120 of the fuel cells 116. Air is supplied from an air supply 122 to the air feed/combustion plenum 124 located adjacent to the second end 112*b* of the housing 112. The air is conveyed via an air supply line 126 through a recuperative air preheater 128 where the air is preheated by combustion products conveyed from the generator 110 through an exhaust line 130.

A dividing wall 144 is located at an end of the generator section 114 adjacent to the second positioning board 140 and a recirculation zone 146 is defined between the dividing wall 144 and the second positioning board 140. Depleted fuel that has passed through the generator section 114 from the fuel plenum 132 passes into the recirculation zone 146.

The second ends 120 of the fuel cells 116 are in sliding engagement with the second positioning board 140 to accommodate thermal movement, i.e., thermal expansion and contraction, of the fuel cells 116 relative to the second positioning board 140. The second positioning board 140 preferably comprises a porous ceramic support structure, and the junction between the second ends 120 of the fuel cells 116 and the second positioning board 40 comprises a tolerant seal 147. No attempt need be made to accomplish a perfect seal at the juncture of the fuel cells 116 and the second positioning board 140, since leakage of a fraction of the depleted fuel from the recirculation zone 146 to the combustion plenum 142 is acceptable. Depleted fuel and air combust in the air feed/combustion plenum 124, and air and combustion products pass through the fuel cells 116 to the exhaust plenum 125.

A portion of the depleted fuel is conveyed out of the recirculation zone 146 through a recirculation line 148 to an ejector pump 150. Fresh fuel is provided from a fuel supply 152 at a high pressure through a fuel line 154 to the ejector pump 150 and provides the motive force for drawing the depleted fuel from the recirculation zone 146 as it combines with the fresh fuel in the ejector pump 150. The combined fresh fuel and depleted fuel passes through a pre-reformer 155 where higher hydrocarbon elements of the incoming fuel are reformed and is then conveyed from the ejector pump 150 to an external reformer 156 through a fuel transfer line 158, and is then conveyed to the fuel plenum 132.

The combustion products and vitiated air entering the exhaust plenum 125 through the fuel cells 116 may be conveyed through a combustion product line 160 to the reformer 156 to provide heat to support a reformation process performed on the fuel, such as is well known in the art. In addition, the combustion products are conveyed from the reformer 156 through the exhaust line 130 to the preheater 128 for preheating incoming air, as described above.

Figure 3A:
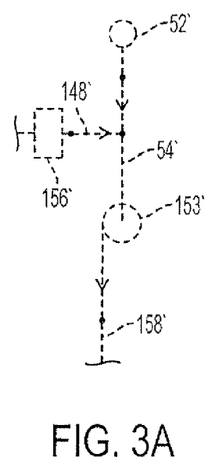
FIG. 3A is a schematic diagram of an alternative configuration of the fuel supply section of the generator of FIG. 3.

In an alternative configuration, the exhaust stream may be routed through a line 161' (shown in dotted line) directly to the preheater 128. In such a configuration, the ejector pump 150 would be replaced by a higher mass flow rate pump. Specifically, the ejector pump 150 may be replaced by a centrifugal circulator 153', as illustrated by FIG. 3A in which an alternative configuration of the fuel supply section of the generator of FIG. 3 is illustrated and in which elements corresponding to elements shown in FIG. 3 are labeled with the same reference numeral primed. As seen in FIG. 3A, the centrifugal circulator 153' replaces the ejector pump 150, and receives a combined stream of fresh fuel and depleted fuel through the fuel line 154'. The centrifugal circulator 153' provides a higher recirculation mass flow rate than the ejector pump 150. The reformer 156' is moved to a location upstream of the centrifugal circulator 153' in the recirculation line 148', and the heat for reforming is provided by the depleted fuel and combustion products in the recirculated fuel stream leaving the generator 110 through the recirculation line 148'.

Figure 4:
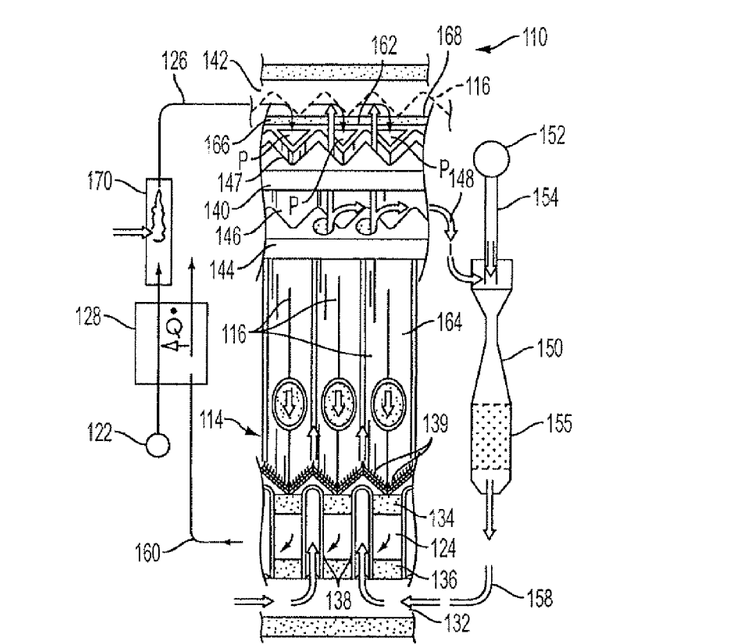
FIG. 4 is diagrammatic illustration of a specific configuration of the generator of FIG. 3.

FIG. 4 illustrates a specific configuration of the generator 110 described above with reference to FIG. 3, and elements in FIG. 4 corresponding to FIG. 3 are identified with the same reference numerals. The generator shown in FIG. 4 includes fuel cells 116 having a cell geometry in which a lanthanum manganite air electrode has the geometric form of a number of integrally connected elements of triangular cross section. These cells comprise Delta X cells, where Delta refers to the triangular shape of the elements and X refers to the number of elements, i.e., the number of fuel cells 116. The resulting overall cross section has a flat face on one side and a multi-faceted face on the other side. An additional row of cells 116 is shown in outline to illustrate the series connection of the fuel cell structure. The air flows within discrete passages P of triangular shape. A lanthanum chromite interconnection covers the flat face 162, and a zirconia electrolyte covers the opposing multifaceted face 164 of the cell geometry and overlaps the edges of the interconnection but leaves most of the interconnection exposed. A nickel/yttria or scandia stabilized zirconia fuel electrode covers most of the electrolyte but leaves a narrow margin of electrolyte between the interconnection and the fuel electrode. Series electrical connections between cells 116 is accomplished by means of a flat nickel felt or nickel foam panel 166, one face of which is sintered to the interconnection at the face 162 while the other face 168 contacts the apexes of the triangular multifaceted fuel electrode face 164 of the adjacent cell (illustrated by dotted line fuel cells 116). Fuel may flow in the discrete passages that are formed between the fuel electrode coated facets of the multifaceted face 164 of one cell 116 and the nickel felt (or foam) covered flat interconnection face 168 of the adjacent cell 116.

The configuration shown in FIG. 4 further illustrates an alternative configuration for the fuel recirculation circuit in which a reformer is not included. After the fuel passes through the fuel pre-reformer 157, the pre-reformed fuel may be conveyed directly to the fuel plenum 132, without passing through an external reformer, if the pre-reformed fuel is directly oxidized on the fuel cell surface, i.e., via anode reforming. In addition, a start-up heater 170 may be included in the air supply line 126 to provide additional heat to the air during start-up of the generator 110.

As noted above, a sealant 39, 139 is provided as a compliant absolute seal to prevent passage of gases between the generator section 14, 114 and an intermediate plenum, i.e., an air plenum 24 or an exhaust plenum 125. In particular, the sealant 39 prevents passage of fresh fuel into contact with fresh air in the air plenum 124, and the sealant 139 prevents passage of fresh fuel into the exhaust products within the exhaust plenum 125. The sealant 39, 139 generally must have an operating temperature range of approximately 700-1000° C. The sealant 39, 139 comprises a composition that is specific to the application of the present invention, and preferably comprises a modified lanthanum borate aluminosilicate (LBAS) glass.

The sealant material is specifically developed to be materially compatible with and have a thermal expansion coefficient (TEC) compatible with the thermal properties of an air electrode of lanthanum manganite (cathode), an electrolyte of yttria or scandia stabilized zirconia and a fuel electrode of nickel/yttria or scandia stabilized zirconia (anode), as well as manifold materials of Al—Mg—O spinel/MgO, such as may be incorporated in the formation of the first positioning board 34, 134. The sealant material is also developed to provide a composition having long term stability over repeated thermal cycles, such as through at least seven thermal cycles, of normal operation of the generator. In general, the LBAS glass sealant material provided for the generator of the present invention comprises a composition of lanthanum oxide ($La_2O_3$), boron oxide ($B_2O_3$), silica ($SiO_2$), alumina ($Al_2O_3$), strontium oxide (SrO), yttria or scandia stabilized zirconia (YSZ or ScSZ), and magnesium oxide (MgO).

The LBAS glass sealant has been developed to accommodate any thermal expansion differential between the fuel cell generator components, such as between the joined surfaces at the junction between the fuel cells 16, 116 and the respective first positioning board 34, 134, and including accommodating thermal expansion of the air electrode, the electrolyte and the manifold materials. For example the composition described herein incorporates a preferred amount of magnesium oxide to modify the thermal expansion coefficient (TEC) of the LBAS glass composition, the preferred composition including magnesium oxide present in an amount of between about 10 to about 30 mole % in the LBAS composition. The TEC of the glass composition at the beginning of its life is approximately $10.95 \times 10^{-6}$/K in the range 25° C.-600° C., which is very close to the TEC of the lanthanum manganite air electrode (cathode), the yttria or scandia stabilized zirconia electrolyte and the Al—Mg—O/MgO spinel manifold materials.

In addition, the composition minimizes or reduces contaminating effects of additives considered essential for the LBAS glass composition. In the present composition, the content of boron oxide ($B_2O_3$) and silica ($SiO_2$) are low to reduce the overall material loss and resultant contamination of the fuel cell system, particularly during long-term operation of the generator. Boron oxide and silica are both included to form glass with other oxides In order to minimize the contaminant contribution of these additives, i.e., through evaporation from the sealant material, a minimal amount of these materials is preferably included and the combined mole percent of boron oxide and silicate is preferably less than about 32% in the LBAS glass composition.

The fuel cell 16, 116 comprises a cathode supported fuel cell that is in contact with the glass sealant composition, and the glass sealant composition is particularly tailored to the specific cathode used for the fuel cell. Further, the glass composition is in contact with both the cathode and the anode, and must be compatible with the materials of both components. Hence, the glass composition includes a preferred amount of lanthanum oxide present in an amount of between about 0 to about 20 mole %, i.e., $0 < La_2O_3 < 20$ mole %, compatible with the cathode; and the glass composition includes a preferred amount of zirconia present in an amount of between about 0 to about 5 mole %, i.e., $0 < ZrO_2 < 5$ mole % and of $YO_{1.5}$ or $ScO_{1.5}$ in an amount of between 0 and 0.5 mole %, i.e., $0<YO_{1.5}<0.5$ mole % or $0<ScO_{1.5}<0.5$ mole %, compatible with the electrolyte as well as with the composition of the anode for the fuel cells.

In view of the above described requirements for the glass sealant composition, it has been found that a modified lanthanum borate aluminosilicate glass composition having the following characteristics may be found to meet the described physical requirements for a sealant in the generator of the present invention:

$La_2O_3$ present in an amount of between about 0 to about 20 mole %;

$B_2O_3$ and $SiO_2$ having a combined mole percent of less than about 32%;

$Al_2O_3$ present in an amount of between about 10 to about 20 mole %;

SrO present in an amount of between about 30 to about 40 mole %;

$ZrO_2$ present in an amount of between about 0 to about 5 mole %;

$YO_{1.5}$ or $ScO_{1.5}$ present in an amount of between about 0 to about 0.5 mole % and MgO present in an amount of between about 10 to about 30 mole %.

In a specific example of the glass sealant composition, the composition consists of: 4.3 mole % $La_2O_3$; 22.2 mole % $B_2O_3$; 9.2 mole % $SiO_2$; 12.9 mole % $Al_2O_3$; 34.5 mole % SrO, 3.7 mole % $ZrO_2$; and $YO_{1.5}$ or $ScO_{1.5}$; and 13.2 mole % MgO.

As noted above, the glass sealant composition is required to have stable properties which do not substantially vary during multiple thermal cycles of the generator, which is determined by the particular content of the composition. In known currently available glass compositions, the compositions may undergo significant changes as they are heated to elevated temperatures with thermal cycling. In particular, it is known that glass may undergo a second glass phase, becoming a glass ceramic (i.e., it crystallizes), which adversely affects the TEC of the glass and which becomes worse as the temperature that the glass is exposed to increases. In contrast, the present glass sealant composition provides a glass that maintains a substantially constant TEC, where the TEC is preferably within a range of about $10.0 \times 10^{-6}$/K to about $11.0 \times 10^{-6}$/K, with an average TEC of about $10.5 \times 10^{-6}$/K after the glass composition has been subjected to multiple thermal cycles. This TEC characteristic is particularly advantageous for the present generator in that the TEC of the glass composition substantially matches the TEC of the electrolyte, which is approximately $10.56 \times 10^{-6}$/K.

Table 1 below shows the thermal expansion coefficient (TEC) and the softening point of the glass composition described by the specific example above. The first column (Beginning of Life) provides the initial TEC of the composition prior to cycling. The first thermal cycle was performed after subjecting the glass composition to a 500 hour thermal treatment at 800° C. As illustrated in Table 1, the TEC is substantially stable after cycling through seven thermal cycles.

Figure 5:
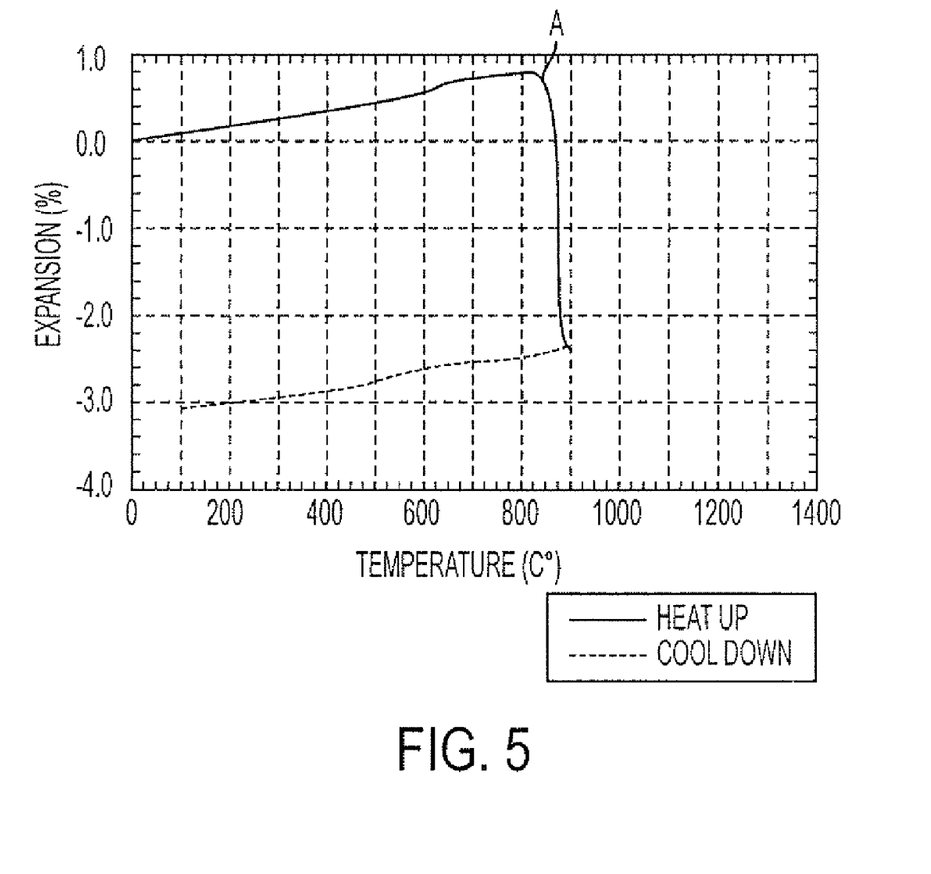
FIG. 5 is graph illustrating the thermal expansion coefficient for a glass sealant composition incorporated in the generator construction of the present invention.

FIG. 5 illustrates the thermal expansion coefficient curve for the glass sealant composition. It can be seen that above 850° C. the glass composition starts to soften (point A) where the thermal expansion curve drops sharply. The softening point is the temperature at which the glass composition becomes a substantially compliant, viscous substance that reduces stresses to the adjacent fuel cell and positioning board surfaces. The close match in TEC between the glass sealant composition and other cell components significantly improves the ability of the seal to survive and maintain an absolute seal at the interface or junction between the fuel cells 16, 116 and the respective first positioning board 34, 134.

A long-term stability test was also performed on the glass sealant composition. In the long-term stability test, the glass composition was exposed to a reducing atmosphere of 3% $H_2/N_2$ and 3% $H_2O$ at 900° C. The test was performed for 2300 hours, and an average evaporation rate of only $2.7 \times 10^{-4}$ (mg/cm$^2$)/hour was achieved. As noted above, the combined amount of boron oxide and silica in the glass composition is kept low such that the amount of these components available for evaporation and contamination within the fuel cell is kept small.

From the above description, it can be seen that the glass sealant composition for the present generator meets multiple criteria for providing an absolute seal within the generator, while providing a stable composition that maintains required operational characteristics throughout multiple cycles, i.e., throughout at least seven cycles. Specifically, the specified composition maintains the TEC within a preferred range which is close to the TEC of the other cell components, and in particular the TEC of the electrolyte of the fuel bell. Further, the glass sealant includes an additive of yttria or scandia and zirconia and thereby reduces the degree that the sealant may dissolve the material of the fuel cell cathode, and in particular to the degree that the zirconia in the electrolyte will be dissolved by the sealant.

Although the above description characterizes the glass sealant composition as a compliant material that may be placed at the junction between the fuel cells 16, 116 and the respective first positioning boards 34, 134, the described material may be processed to form a rigid sheet (not shown) that may be stamped to provide holes for receiving the fuel cells. In such a construction, the sheet would comprise a hard glass sheet that would provide a seal but not shrink significantly when in use within the generator. The lack of volume change or shrinkage would permit the sheet of glass composition to contact the fuel cells without significant additional stresses at the seal locations during variations in temperature within the generator.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

TABLE 1

|  | Beginning of Life | $1^{st}$ | $2^{nd}$ | $3^{rd}$ | $4^{th}$ | $5^{th}$ | $6^{th}$ | $7^{th}$ |
| --- | --- | --- | --- | --- | --- | --- | --- | --- |
| TEC ($10^{-6}$)/K | 10.95 | 9.09 | 12.22 | 11.02 | 10.35 | 10.52 | 10.84 | 10.08 |
| Softening point (° C.) | 850 | >850 | 940 | 950 | 970 | 950 | 950 | 960 |

What is claimed is:

1. A solid oxide fuel cell generator for electrochemically reacting a fuel gas with a flowing oxidant gas at an elevated temperature to produce power, said generator comprising
  a generator section receiving a fuel gas;
  a plurality of elongated fuel cells extending through said generator section and having opposing open fuel cell ends for directing an oxidant gas between opposing plena in said generator;
  a sealant defining a seal on said fuel cells adjacent at least one of said fuel cell ends, said sealant comprising a lanthanum borate aluminosilicate glass composition;
  wherein said fuel cells comprise a fuel electrode of nickel/yttria or scandia stabilized zirconia, an oxidant electrode of lanthanum manganite and an electrolyte of yttria or scandia stabilized zirconia, and said glass composition further comprises:
  $La_2O_3$ present in an amount up to about 20 mole %;
  $Al_2O_3$ present in an amount of between about 10 to about 20 mole %;
  SrO present in an amount of between about 30 to about 40 mole %;
  $ZrO_2$ present in an amount up to about 5 mole %;
  at least one of $YO_{1.5}$ and $ScO_{1.5}$ present in an amount up to about 0.5 mole %; and
  MgO present in an amount of between about 10 to about 30 mole %; and
  wherein said glass composition includes $B_2O_3$ and $SiO_2$ having a combined mole percent of less than 32%.

2. The generator of claim 1, wherein the glass composition constituents are present as 4.3 mole % $La_2O_3$, 22.2 mole % $B_2O_3$, 9.2 mole % $SiO_2$, 12.9 mole % $Al_2O_3$, 34.5 mole % SrO, 3.7 mole % $ZrO_2$ and $YO_{1.5}$ or $ScO_{1.5}$; and 13.2 mole % MgO.

3. A solid oxide fuel cell generator for electrochemically reacting a fuel gas with a flowing oxidant gas at an elevated temperature to produce power, said generator comprising:
  a generator section receiving a fuel gas;
  a plurality of elongated fuel cells extending through said generator section and having opposing open fuel cell ends for directing an oxidant gas between opposing plena in said generator;
  a sealant defining a seal on said fuel cells adjacent at least one of said fuel cell ends, said sealant comprising a lanthanum borate aluminosilicate glass composition; and
  wherein said lanthanum borate aluminosilicate glass composition includes $La_2O_3$ present in an amount up to about 20 mole %, $ZrO_2$ present in an amount up to about 5 mole %, and at least one of $YO_{1.5}$ and $ScO_{1.5}$ present in an amount up to about 0.5 mole %; and wherein said glass composition further comprises: $B_2O_3$ and $SiO_2$ having a combined mole percent of less than about 32%; $Al_2O_3$ present in an amount of between about 10 to about 20 mole %; SrO present in an amount of between about 30 to about 40 mole %; and MgO present in an amount of between about 10 to about 30 mole %.

4. The generator of claim 3, wherein said fuel cells comprise a fuel electrode of nickel/yttria or scandia stabilized zirconia, an oxidant electrode of lanthanum manganite and an electrolyte of yttria or scandia stabilized zirconia.

5. The generator of claim 3, wherein the glass composition constituents are present as 4.3 mole % $La_2O_3$, 22.2 mole % $B_2O_3$, 9.2 mole % $SiO_2$, 12.9 mole % $Al_2O_3$, 34.5 mole % SrO, 3.7 mole % $ZrO_2$ and $YO_{1.5}$ or $ScO_{1.5}$, and 13.2 mole % MgO.

* * * * *